United States Patent [19]
Garrison et al.

[11] 3,886,719
[45] June 3, 1975

[54] CONTINUOUS LOADING STACKER

[75] Inventors: Harold Keith Garrison, Newton; Martin Eugene Pruitt, Hesston, both of Kans.

[73] Assignee: Hesston Corporation, Hesston, Kans.

[22] Filed: Dec. 5, 1973

[21] Appl. No.: 422,092

[52] U.S. Cl. .................. 56/344; 100/215; 100/245; 214/518
[51] Int. Cl. ............................................ A01d 85/00
[58] Field of Search ...................... 56/341, 344–350; 100/214, 215, 245; 214/508, 518, 522

[56] References Cited
UNITED STATES PATENTS

| | | | |
|---|---|---|---|
| 3,733,798 | 5/1973 | Garrison | 56/350 |
| 3,744,228 | 7/1973 | Lundahl | 56/344 |
| 3,813,861 | 6/1974 | Wood | 56/344 |
| 3,842,730 | 10/1974 | White et al. | 100/245 |

Primary Examiner—Russell R. Kinsey
Attorney, Agent, or Firm—Schmidt, Johnson, Hovey & Williams

[57] ABSTRACT

In the formation of a dense, compacted crop stack carried out by lifting a windrow off a field and blowing it into a moving, hollow body for periodic vertical compression by the upper section of the body, crop pickup and loading may be carried out continuously, even during the compression cycle of the machine, by virtue of accumulating structure carried on the roof of the upper section that collects and confines crops blown onto the roof during compression. The accumulated crop is dumped into the body therebelow from time to time at the rear of the body instead of the front thereof to prevent blockage of the incoming crop being loaded into the body and to encourage proper distribution of the crop. The accumulating structure on top of the roof is collapsible, expanding and contracting the accumulating chamber defined therewithin during lowering and raising of the roof, so that when the upper section is fully raised, no significant increase in height is imparted to the machine by the accumulating structure.

20 Claims, 13 Drawing Figures

PATENTED JUN 3 1975

3,886,719

SHEET 1

PATENTED JUN 3 1975 3,886,719

SHEET 2

CONTINUOUS LOADING STACKER

This invention relates to the concept of forming relatively large, skillfully and carefully compacted stacks of animal foodstuffs as contrasted to the production of small wafers or bales of compressed materials and, more particularly, to the concept of nonstop, continuous loading of the mobile machine for producing such stacks even during the interval that the foodstuffs are being compacted within the machine. Excellent examples of machines embodying the basic stack-forming principles of this invention are found in prior conceptually interrelated U.S. Letters Pat. Nos. 3,556,327, issued to Garrison on Jan. 19, 1971; 3,691,741, issued to White, et al. on Sept. 19, 1972; and 3,732,672, issued to Adee, et al. on May 15, 1973. All of these basic patents relate to various aspects of stack-forming machines that may be advanced along a crop windrow for picking up and blowing the crop into an essentially closed stack-forming body having an open top, lower section and an open bottom, upper section that telescopes within the lower section for periodically applying a firm, downwardly directed compacting force against the crop collected within the body to compress the same into a stack. By virtue of this closed container - vertical compaction approach, stacks can be formed in an optimum manner that are highly dense, strongly cohesive so as to resist destruction during handling and relocation thereof, and highly resistant to the destructive effects of inclement weather. In this latter respect the downward concaveness of the upper section imparts a crowned top to the stack that readily sheds moisture.

These basic principles have been highly successful and instrumental in making a revolutionary contribution to the crop-handling art and, therefore, while the present invention provides certain improvements to these concepts in order to present even further contributions to the industry, it is always an overriding consideration that the aforementioned concepts be fully preserved and adhered to without in any way detracting therefrom.

One previous effort to improve upon the teachings of the aforementioned Patents is disclosed in my U.S. Letters Pat. No. 3,733,798, issued May 22, 1973, wherein the concept of continuous loading is added to the stack-forming principles of said earlier patents. By using the machine embodied within my U.S. Pat. No. 3,733,798 patent, it was possible to continuously advance the machine across a field and continuously feed the picked-up crop into the machine without interruption because of auxiliary structure which temporarily accumulated the crop during the interval that the upper section was reciprocated to compact the crop. During the upstroke of the upper section, the crop which had been accumulated during the downstroke was dumped into the body so that the compression cycle could be carried out without losing the crop which was being picked up and fed non-stop by the advancing machine.

One important object of the present invention is to expand upon the continuous loading concepts of my previous U.S. Pat. No. 3,733,798 and to provide an alternative approach to the specific means of said patent for accomplishing continuous loading.

Another important object of this invention is to provide a continuous loading, stack-forming machine having accumulator structure that is located on top of the pressing roof of the machine so that the efforts of the roof and the remainder of the upper section in producing a cohesive stack provided with a specially crowned top are not in any way interfered with, even though the feature of continuous loading has been added thereto.

An additional important object of this invention is to provide accumulating structure as aforesaid that becomes collapsed when the upper section is disposed at its upper limit of travel whereby to provide the highly desirable feature of roof-mounting but without significantly increasing the overall height of the machine when the upper section is fully raised.

A further important aspect of this invention is the provision of dumping the crop which has accumulated on top of the roof during the pressing cycle into the rear end of the body instead of into the front end thereof so that the dumped crop will not interfere with feeding of newly picked-up crop into the body at the front end thereof.

A still further important object of this invention is the provision of an accumulator which, although mounted on top of the roof and collapsible during reciprocation of the latter, is sturdily and strongly supported at all times to both receive the crop being blown thereinto without accidental collapse and to withstand the pressures of strong winds.

An additional important object of this invention is to provide sturdy accumulating structure on top of the pressing roof of the machine as aforesaid which does not in any way interfere with the escape of air from the air-crop stream being projected by the feeder into the body.

Yet another important object of the instant invention is to provide a stack-forming machine which allows continuous feeding of the crop not only during the pressing cycle of the machine, but during the stack-unloading cycle as well.

Figure 1:
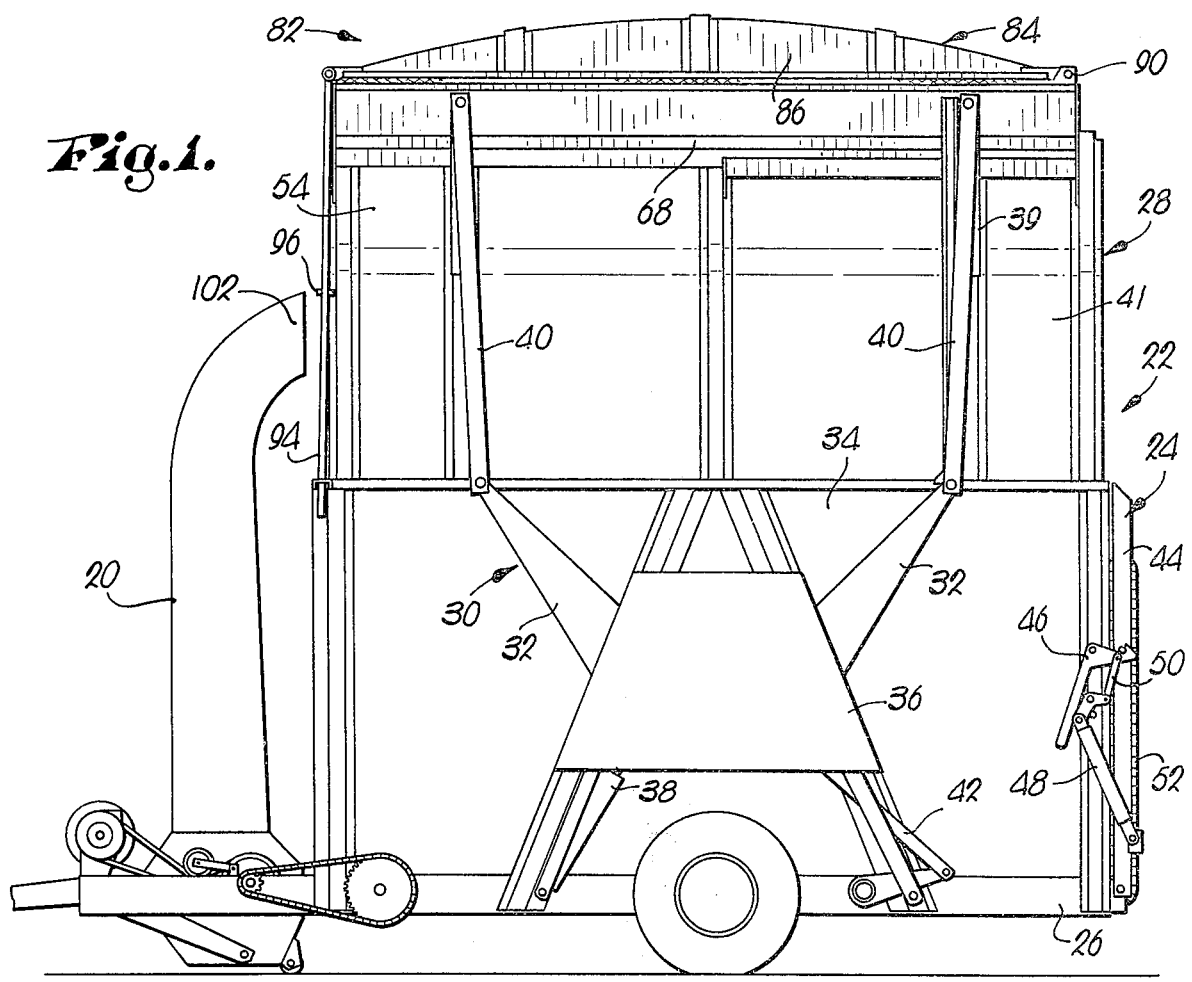
FIG. 1 is a side elevational view of a continuous loading machine embodying the principles of the present invention, the upper body section thereof being fully raised and the accumulating structure being fully collapsed.

The continuous loading machine of the present invention includes a wheeled vehicle having a combination crop pickup and feeder 20 that blows the crop rearwardly into a collapsible, essentially closed, hollow body 22 of the vehicle as the latter advances across the field. The body 22 includes an open top, lower section 24 having a bed 26, and an open bottom, upper section 28 telescopically received by lower section 24 for vertical reciprocation within the latter between the extreme positions illustrated in FIGS. 1 and 2. Suitable power means is utilized to raise and lower section 28, and such means may, for example, take the form of a mechanism 30 on each side respectively of body 22 (only one of the mechanisms 30 being shown). Each mechanism 30 includes a pair of intermeshing, generally triangular gear segments 32 that are individually pivoted to a corresponding sidewall 34 of lower section 24 behind a trapezoidal cover 36 for simultaneously swinging in opposite directions in response to the extension and retraction of a piston and cylinder assembly 38 operably coupled to one of the segments 32. The ends of segments 32 remote from the geared interconnection therebetween are pivotally connected to links 40 which are in turn pivotally connected at their upper ends to upstanding gussets 39 (FIG. 6) on sidewall 41 of the upper section 28. Although not illustrated, it is to be understood that a common torque shaft may extend transversely below bed 26 and interconnect the two mechanisms 30 for rendering the same simultaneously operable, there being cranked linkage 42 at opposite ends of the torque shaft interconnecting the same with a gear segment 32 that is not coupled to the piston and cylinder assembly 38.

Figure 2:
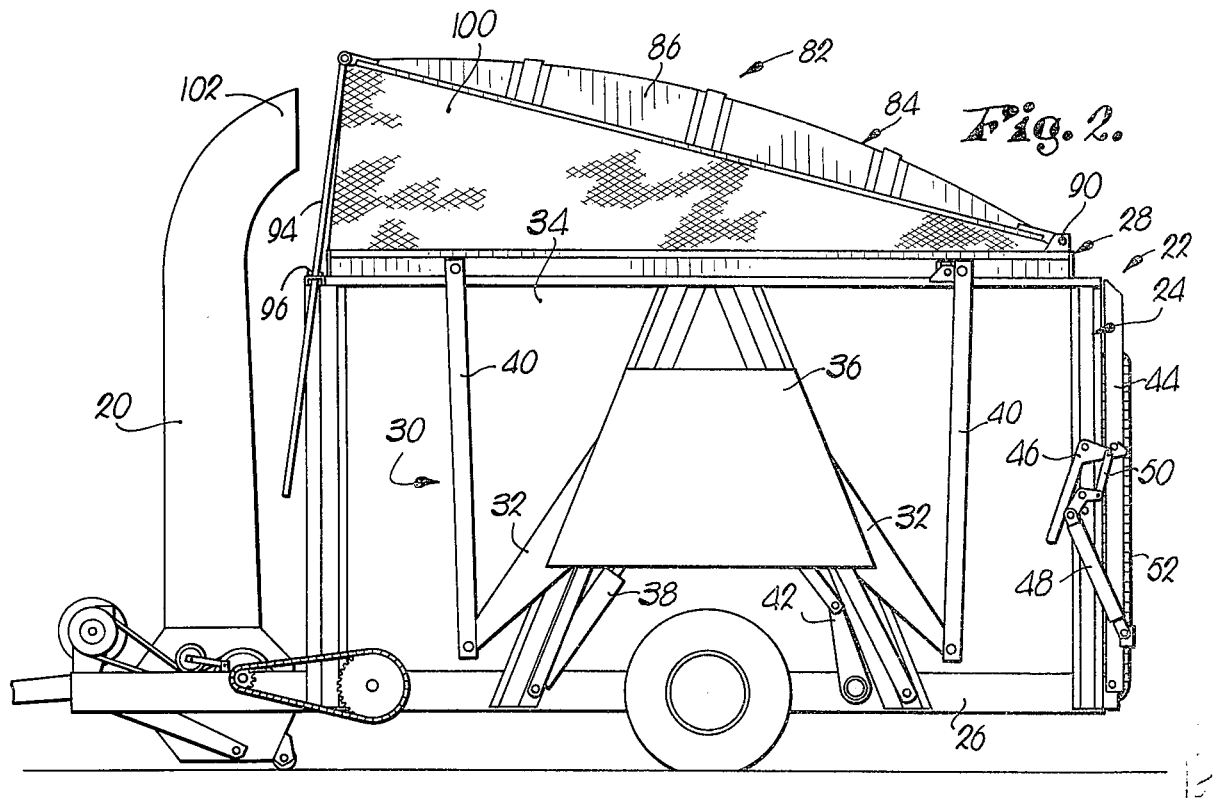
FIG. 2 is a side elevational view of the machine with the upper section fully lowered and the accumulating structure opened to its fullest extent.
Figure 3:
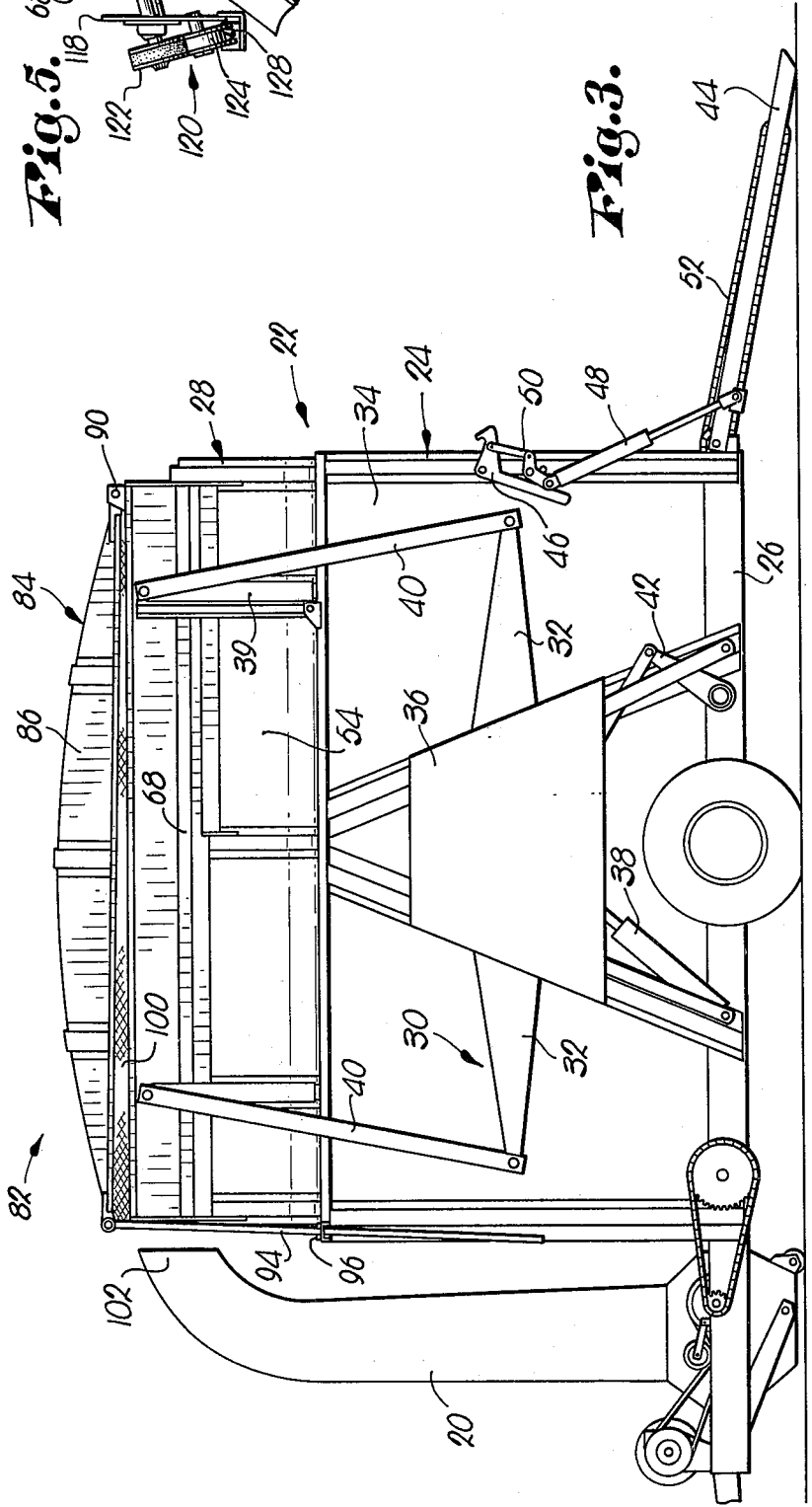
FIG. 3 is a side elevational view of the machine illustrating the accumulator and upper section in intermediate positions suitable for unloading of the formed stack.

The lower section 24 is in the nature of a rectangular, open top box which is closed across the front thereof (not shown, although it is to be understood that such front closure may be foraminous) and may be selectively opened or closed across the back thereof by an endgate 44 pivoted at its lower end to bed 26 for swinging between the closed position illustrated in FIGS. 1 and 2 and the opened, unloading position illustrated in FIG. 3. A latch 46 on lower section 24 for the endgate 44 may be operated by a piston and cylinder assembly 48 coupled at one end with endgate 44 and coupled at the other end with latch 46 through crank linkage 50. Mover chains 52 may be provided on endgate 44 for use in engaging the bottom of the stack and moving the same in a direction to unload the stack when endgate 44 is lowered into its ramp position of FIG. 3.

Figure 6:
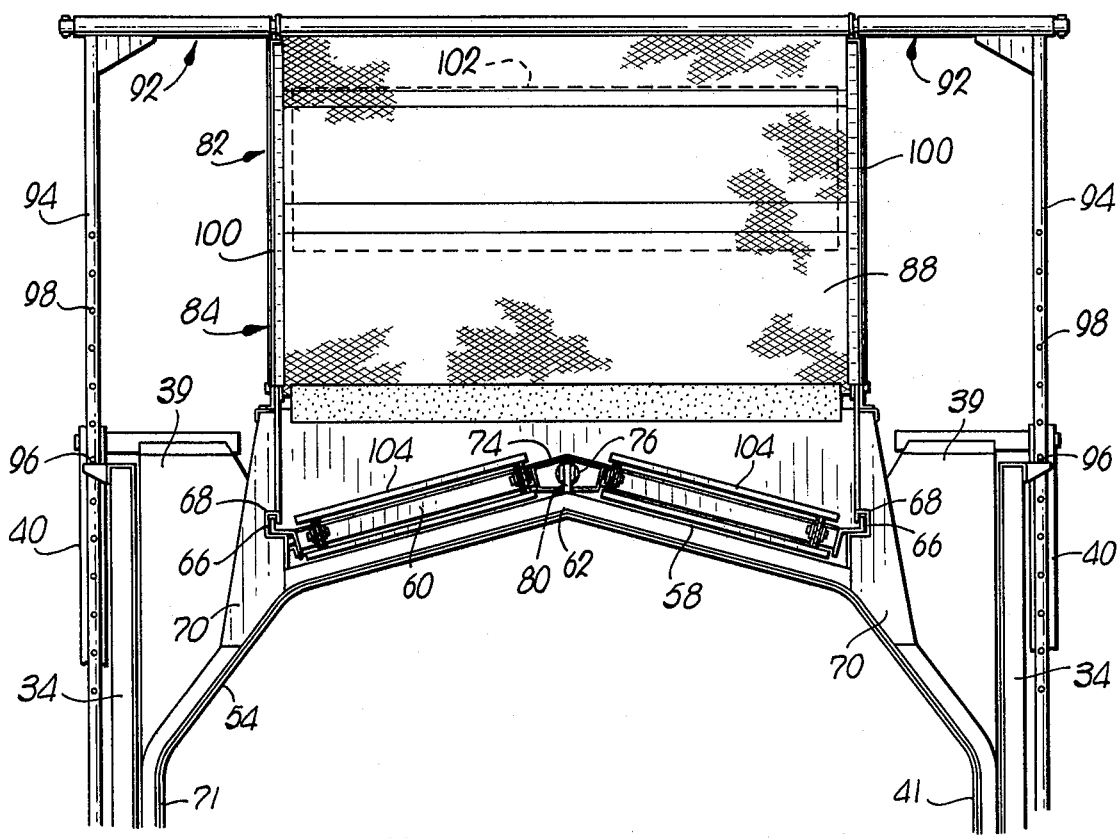
FIG. 6 is an enlarged, fragmentary front elevational view of the upper section and the accumulator when the latter is fully opened as illustrated in FIG. 2.

The upper section 28 is, in contrast to lower section 24, generally transversely arcuate, as illustrated best in FIG. 6, by virtue of a peaked roof 54 that extends over the top of upper section 28, interconnecting the two upright sidewalls 41 thereof. The upper section 28 is open across its front to allow crop to be blown into body 22 by feeder 20 beneath roof 54, and is closed across the rear thereof by a depending, swingable door 56 shown only in FIGS. 9–13. Thus, the body 22 is essentially closed and hollow except for the inlet thereto afforded by the open front of upper section 28.

Figure 8:
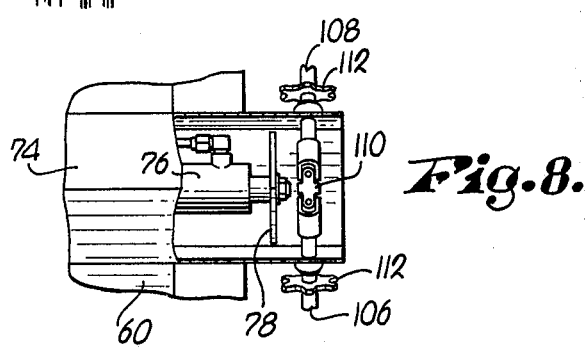
FIG. 8 is an enlarged, fragmentary, partly cross-sectional view of the central, rearmost end of the shiftable gate on the roof.
Figure 7:
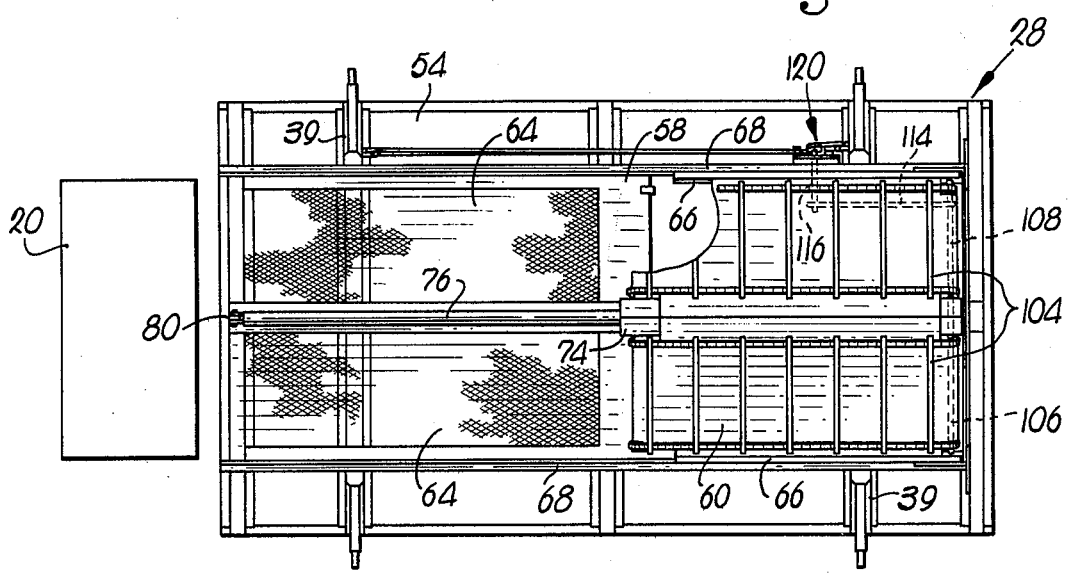
FIG. 7 is a top plan view of the machine with the accumulator removed to reveal details of the roof therebelow.
Figure 12:
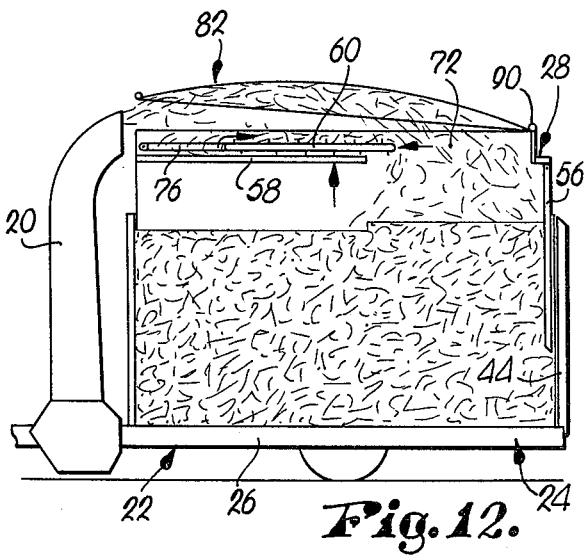
Figure 13:
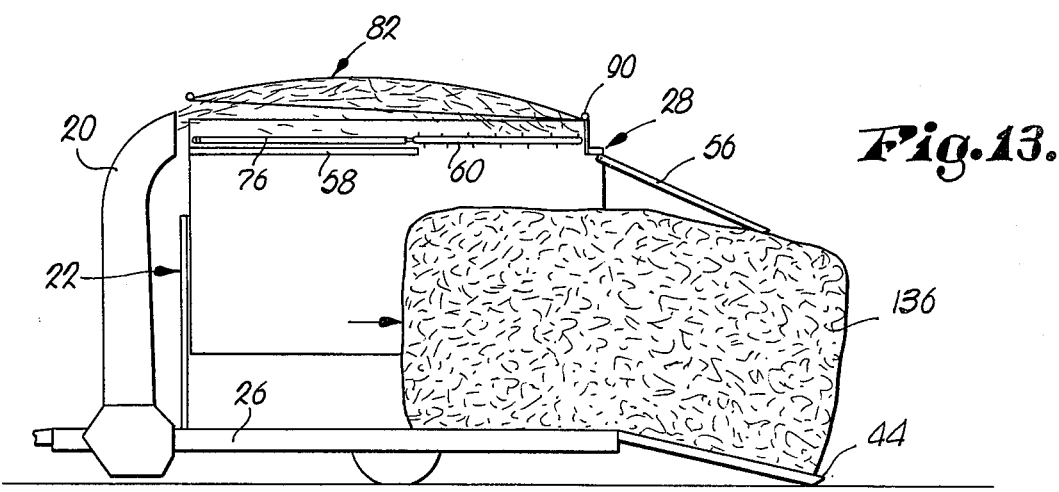
FIG. 13 is a schematic view of the machine similar to FIGS. 9–12 illustrating the manner in which the formed stack may be unloaded while the machine continues to advance and to be supplied with picked-up crop.

Turning primarily to FIGS. 6, 7 & 8, the roof 54 has a pair of parts 58 and 60 located at the uppermost regions of roof 54, the part 58 covering approximately the forward half of roof 54 and the part 60 covering the rear half thereof. Both of the parts 58 and 60 are downturned slightly on opposite, upwardly converging sides thereof presenting a peak 62 to the roof 54 that extends centrally of the latter for the full fore-and-aft length thereof. The part 58 has a pair of foraminous pieces 64 on opposite sides of peak 62 and is rigidly secured in its frontal position as illustrated. On the other hand, the part 60 is rendered shiftable by laterally projecting, fore-and-aft extending, upturned side margins 66 (FIGS. 5 and 6) that are slidably received within horizontally disposed trackways 68 supported by triangular braces 70 on roof 54 and extending the full fore-and-aft length of the latter above part 58. The rear part 60 thus takes the form of a gate which can be shifted along trackways 68 from its closed position illustrated in FIG. 7 to an opened position wherein the part 60 (hereinafter referred to as "gate" 60) overlies front part 58, thereby presenting an opening in the rear of the roof 54 denoted by the numeral 72 as illustrated in FIG. 12.

A tube 74 extends along and above peak 62 in gate 60 to house a portion of a piston and cylinder unit 76 anchored at one end to a mounting lug 78 in tube 74 at the rear of the latter, and anchored at the opposite end to an upstanding ear 80 on the forwardmost portion of roof part 58. Gate 60 may thus be hydraulically controlled, with the piston and cylinder unit 76 simply extending or retracting within tube 74 as gate 60 is pushed or drawn along trackways 68.

Disposed on top of roof 54 and carried thereby is accumulator structure denoted broadly by the numeral 82 and hereinafter referred to as the accumulator. The accumulator 82 has an elongated hood 84 that is longitudinally concave, presenting a pair of generally crescent-shaped sidewalls 86 (one only being shown) and an arcuate top wall 88 (FIG. 6) that is preferably of foraminous material. Hood 84 extends the full fore-and-aft length of roof 54 and is pivotally secured at its rear end to the latter by a pivot 90 at each rear corner. On the other hand, the front of the hood 84 is connected to the lower section 24, such connection being presented by a generally inverted, U-shaped framework 92 (FIG. 6) having vertically extending side members 94 outboard of sidewalls 86 which are received by suitable aperture means (not shown) in lower section 24. For purposes which will hereinafter be made clear, the upright members 94 are vertically shiftable in such aperture means of lower section 24 to an extent determined by a set of pins 96 which may be selectively inserted into a vertical series of holes 98 along the members 94. While the front connection of hood 84 with lower section 24 is thus rendered extensible to a certain degree with lost motion resulting during operation as will hereinafter be described, it is important to recognize that such front connection is made with the lower section 24, as distinguished from the rear connection which is made with the roof 54.

The accumulator 82 also has netting 100 interconnecting hood 84 and roof 54 on opposite lateral sides of hood 84. The netting 100 thus presents collapsible sides for the accumulator 82 that cooperate with the hood 84 and roof 54 to define a generally wedge-shaped accumulating chamber, open at the front and closed at the rear, that is expanded and contracted during reciprocation of the upper section 28. As illustrated in FIG. 6, the accumulator 82 is centered upon roof 54 so as to be horizontally aligned with the similarly centered outlet 102 of feeder 20.

Figure 5:
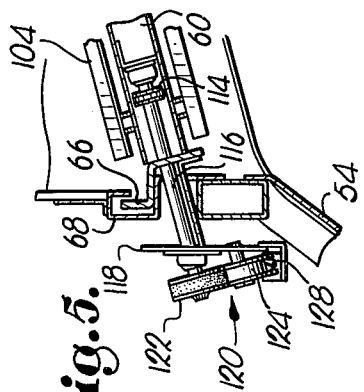
FIG. 5 is a fragmentary, cross-sectional view of the system taken along line 5—5 of FIG. 4.

The gate 60 is provided with two sets of drag chains 104 on opposite sides of tube 74, such chains 104 moving rearwardly when gate 60 is shifted forwardly in order to engage and displace any crop which has accumulated ahead of opening 72 rearwardly toward the same for dumping therethrough. As illustrated in FIGS. 7 and 8, a pair of end-to-end drive shafts 106 and 108 across the rear of gate 60 are interconnected by means of a universal joint 110 within tube 74, the shafts 106 and 108 carrying sprockets 112 for engaging and driving the chains 104 when shafts 106 and 108 are rotated in unison. The shaft 108 has an endless, forwardly extending chain 114 coupled therewith at one rear corner of gate 60 which is also coupled with a laterally extending shaft 116 forwardly of shaft 108, the shaft 116 projecting laterally from roof 54 as illustrated in FIG. 5 and through an upright plate 118 rigidly secured to gate 60. The plate 118 is thus shiftable fore-and-aft along roof 54 with the gate 60 when the latter is actuated by piston and cylinder unit 76.

Figure 4:
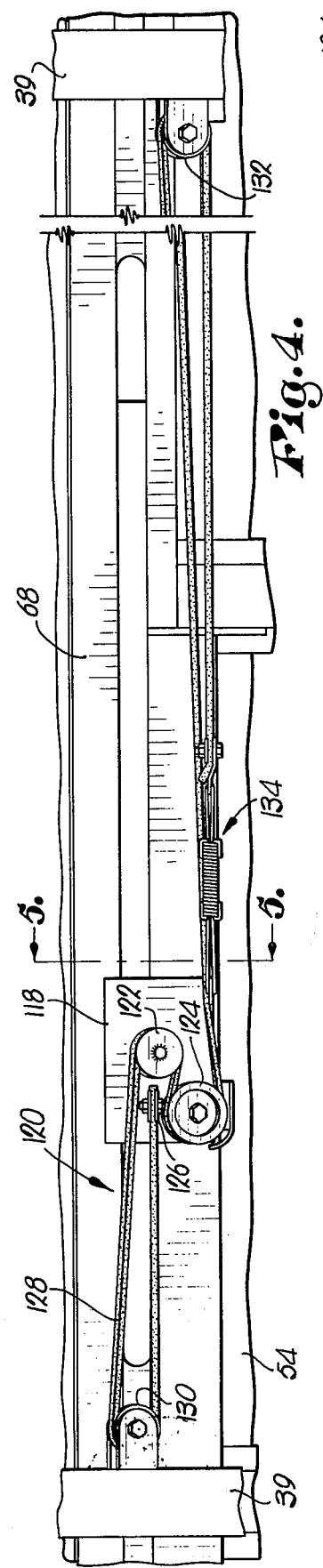
FIG. 4 is an enlarged, fragmentary side elevational view of one side of the upper section illustrating in detail the pulley system for actuating the drag chain on the dumping gate of the roof during opening of the gate.

The chains 104 are operated automatically when gate 60 is actuated by piston and cylinder unit 76, and the apparatus for performing such automatic operation is denoted broadly by the numeral 120 in FIGS. 4 and 5. A first rotatable sheave 122 is mounted on the outermost end of shaft 116 for movement with plate 118 during fore-and-aft reciprocation thereof, and a second sheave 124 is rotatably mounted on plate 118 slightly below and rearwardly of sheave 122. An anchor 126 on plate 118 terminates one end of a flexible drive member in the nature of a belt 128 that extends rearwardly from anchor 126, is looped about a pulley 130 on a stationary portion of roof 54, then extends forwardly where it is looped in a reverse S about sheaves 122 and 124, extends therefrom forwardly to loop about a second pulley 132 on a forward stationary portion of roof 54, finally terminating at an anchor spring assembly 134 that is itself secured to the plate 118.

The assembly 134 is so arranged as to maintain tension in the belt 128, and it is to be recognized that when the plate 118 shifts forwardly toward pulley 132, the rear loop in belt 128 between sheave 122 and pulley 130 is tightened so as to rotate sheave 122 in a counterclockwise direction viewing FIG. 4. Such rotation is transmitted to the chains 104 via shafts 116, 108, 106 and chain 114 to drive the chains 104 rearwardly as the gate 60 is displaced forwardly. On the other hand, when the gate 60, and hence the plate 118, is shifted rearwardly, the front loop in belt 128 between sheave 124 and pulley 132 is tightened, while the rear loop is loosened, thereby imparting no driving rotation to sheave 122 during such rearward shifting of gate 60. Hence, the drag chains 104 do not operate while the gate 60 is being shifted rearwardly.

OPERATION

The machine may be self-propelled or may be tractor-drawn in the same manner as those machines illustrated in the aforesaid patents. The basic stack-forming steps are the same in the present machine as those outlined in said patents in that a crop is picked up by the combination pickup and feeder 20 and is blown rearwardly into the body 22, whereupon the upper section 28 is periodically lowered against the collected crop to compress the same into a well-shaped, cohesive mass. Several pressing cycles may be necessary from time to time with more crop being added to each previously compressed mass until a final compressed stack is produced of the desired size. Because of the firm downward pressure applied by the upper section 28 with its roof 54 against the top of the compressed crop, and by virtue of the manner in which the upper section 28 fully embraces the crop during the pressing cycle, the final stack has the highly desirable qualities of high density, cohesiveness and weather shedding ability.

Figure 9:
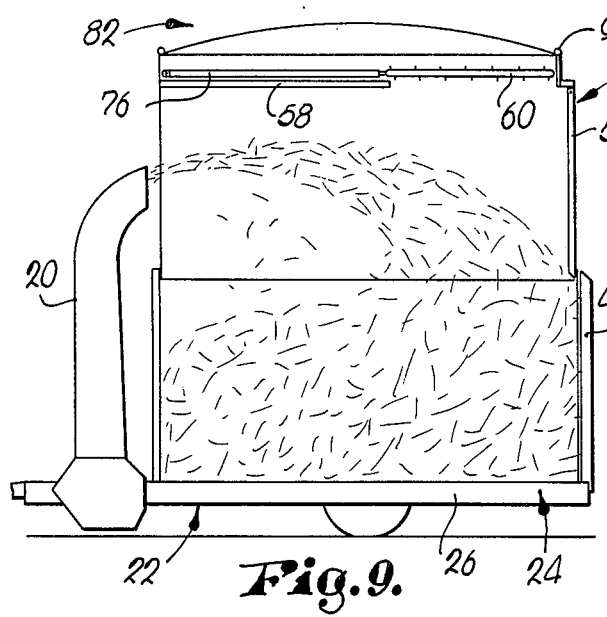
FIGS. 9–12 are essentailly schematic views of the machine illustrating the same at successive stages of the stack-forming cycle.

Turning now to FIGS. 9–12, the special role of the accumulator 82 may be clearly seen. When the upper section 28 is fully raised as illustrated in FIG. 9, the accumulator 82 is fully collapsed with the hood 84 lying essentially flatly against roof 54. At this time, the crop from feeder 20 is directed into body 22 below accumulator 82 and roof 54 as illustrated. By virtue of the foraminous nature of the roof part 58 and the foraminous nature of the top wall 88 of hood 84, the air which is associated with the crop entering body 22 is allowed to exhaust or escape therefrom vertically.

Figure 10:
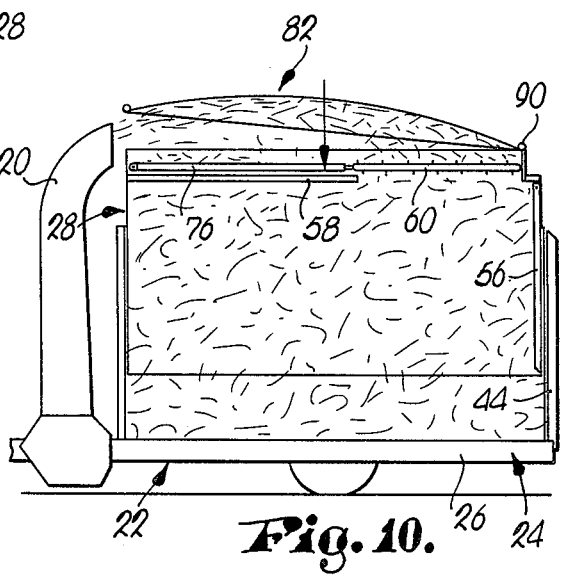
Figure 11:
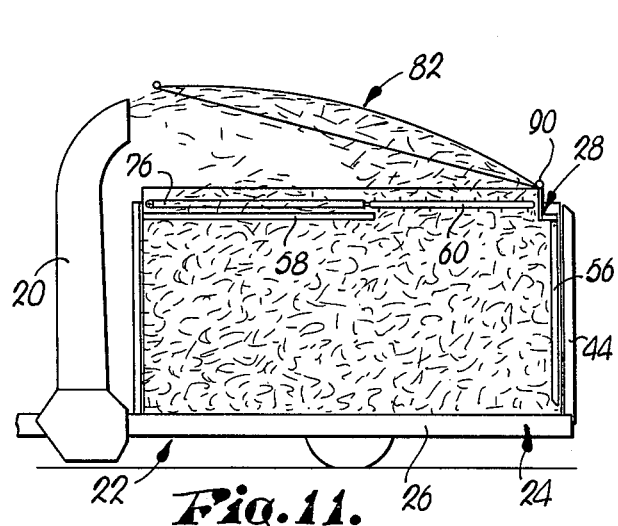

Before the crop can build up in the body in such a manner that it will block the outlet 102 of feeder 20, the mechanisms 30 are actuated to begin a press cycle, all without interrupting the feeding of the crop by feeder 20. As the upper section 28 is progressively lowered, the hood 84 remains level and the accumulator 82 thus remains collapsed until the upper section 28 reaches a position just before that illustrated in FIG. 10. Thereupon, the upright members 94 at the front of hood 84 that have been sliding downwardly through lower section 24 on the outside thereof, are stopped by engagement of the cross pins 96 with lower section 24, thereby precluding further descent of the front of hood 84. However, inasmuch as the rear of hood 84 is attached through pivots 90 to the roof 54, the rear of hood 84 continues to descend, thereby effectively opening the accumulator 82 as hood 84 begins to cant downwardly and rearwardly as shown. Thus, as roof 54 passes the feeder outlet 102 as illustrated in FIG. 10, the crop begins to be projected into accumulator 82 onto the roof 54 and between the side nettings 100.

By the time the continuously moving upper section 28 has reached the position of FIG. 10, the roof part 58 and gate 60 begin to function both as a floor for the accumulator 82 and as part of the compacting means for the crop below roof 54. Thus, as the upper section 28 continues beyond the FIG. 10 position thereof toward the lower limit illustrated in FIG. 11, the crop below roof 54 becomes firmly compressed and formed in the contour of roof 54, while the crop emanating from feeder outlet 102 continues to collect within accumulator 82.

Upon reaching its lower limit of travel, the direction of movement of upper section 28 is reversed as the mechanisms 30 begin to raise the same off the compressed crop as illustrated in FIG. 12. Simultaneously with initiation of such raising, the piston and cylinder unit 76 may be actuated by the operator to open gate 60 and present the opening 72 through which the accumulated crop may enter body 22 at the rear thereof. Simultaneously with opening of gate 60 the drag chains 104 are automatically operated in the manner earlier described by apparatus 120 to draw any crop which may have dropped from the airstream onto roof part 58 rearwardly toward opening 72 for discharge therethrough into body 22. It is to be noted that during this initial upstroke of the upper section 28 wherein dumping of the accumulated crop is commenced, the feeder 20 continues to deliver crop into the accumulator 82 which, although progressively closing as upper section 28 rises, is still sufficiently open to accept the crop being delivered by feeder 20.

When the roof 54 passes the feeder outlet 102 on its way up, the crop from feeder 20 shoots into body 22 below roof 54 for collection on top of the compressed crop ahead of the loose crop dumped through opening 72. As the upper section 28 rises above the position illustrated in FIG. 12, the rear end of hood 84 reaches the same level as the front end thereof, whereupon, lying flatly against roof 54, the hood 84 is carried upwardly in a level condition until section 28 is fully raised as illustrated in FIG. 9. The gate 60 may then be shifted rearwardly by piston and cylinder unit 76 to its closed position, during which time the drag chains 104 are not operated by apparatus 120 because the belt 128 becomes slack around the drive sheave 122 in the manner earlier described.

It is to be emphasized that the above operations were carried out while the feeder 20 was continuously operating and the machine was continuously advancing. These may be repeated several times over, without stopping the machine, until a cohesive stack having the desired dimensions is produced, whereupon the upper section 28 should be elevated slightly after its final downstroke to at least the approximate position illustrated in FIG. 13 and the machine slowed slightly while the feeding continues. Then, the latches 46 for endgate 44 may be released by the piston and cylinder assemblies 48 to lower the endgate 44 into its ramp position illustrated in FIG. 13. Thereupon any suitable moving mechanism (not shown but well understood by those skilled in the art) disposed within lower section 24 along bed 26 may be actuated to engage the stack denoted 136 and shift the same rearwardly out of body 22 and down endgate 44 onto the ground. During such unloading, the free-swinging door 56 of upper section 28 is pushed upwardly by the rearwardly moving stack 136 as illustrated. When the stack 136 has been unloaded, the endgate 44 may be raised and relatched into its closed position by piston and cylinder assemblies 48, whereupon the upper section 28 may be fully raised and the accumulated crop dumped into body 22.

It will be appreciated therefore, that the goals of the invention as initially set forth can be fully met by the machine hereinabove described. By virtue of the accumulator 82, the machine can be continuously advanced and the crop feeder 20 continuously operated, even during the pressing and unloading cycles of the machine. Moreover, by mounting accumulator 82 onto the top of the roof 54 instead of locating accumulating structure within the interior of the upper section 28, the highly successful stack-forming principles utilized in the machines of several of the earlier mentioned patents are in no way disturbed or interfered with. The only change is a beneficial one, that of permitting continuous loading on top of the upper pressing section while pressing is carried out therebelow. Moreover, because of the collapsible nature of the accumulator 82, the latter may be placed on top of the roof 58 without significantly increasing the overall height of the machine when the upper section 28 is fully raised. On the other hand, it will be appreciated that because the hood 84 is gently concave, a small storage space is presented above roof 54 even when upper section 28 is fully raised. Thus, sufficient room is made available to accomodate accumulated crop in the event the operator should inadvertantly raise the section 28 to its upper limit without opening gate 60.

Additionally, the cross pins 96 can be pulled from the upright members 94, thereby allowing the hood 84 to lie flatly against roof 54 when upper section 28 is fully lowered, presenting a low profile for transport of the machine.

Also noteworthy is the fact that the longitudinal concaveness of the hood 84 helps direct the crop being blown into the accumulator 82 downwardly and rearwardly primarily onto the gate 60 rather than onto the forward roof part 58. Hence, only a small amount of crop material must be removed from roof part 58 by the drag chains 104 when the gate 60 is opened. Moreover, it is to be emphasized that because the material which has accumulated on top of roof 54 is dumped into body 22 at the rear of the latter, the free flow of crop material from feeder 20 into the front of body 22 is not interfered with by previously dumped, accumulated material.

Further, it should be explained that the lost motion produced at the front of accumulator 82 with regard to expanding the chamber thereof during pressing avoids causing such expansion sooner than and more fully than is necessary to handle the amount of crop normally received during pressing. Inasmuch as the feeder outlet 102 is not reached until approximately midway through the pressing stroke, there is no need to initiate the expansion of the accumulating chamber until just before roof 54 passes outlet 102. Moreover, this means that hood 84 need not be tipped back an excessive amount, which encourages structural stability, improves the guiding effect of the concave inner surface of top 88, and reduces the amount of netting material required for sides 100.

In view of all of these factors, the stack-forming and unloading process can continue at a rapid rate without interruption and can be handled by a single operator without requiring excessive operator attention.

Having thus described the invention, what is claimed as new and desired to be secured by Letters Patent is:

1. In a continuous loading-stacking machine, a
   hollow, crop-receiving body having a lower, open top section provided with a bed and an upper, open bottom section provided with a roof;
   apparatus operable continuously as the machine is advanced for picking up a crop off a field and feeding the same into the body while the upper section is raised,
   said lower section being provided with means supporting the upper section for vertical reciprocation whereby, upon lowering of the upper section from time to time during continuous machine advancement, said roof thereof will move toward the bed against the crop collected in the body to compress said collected crop,
   said roof being disposed for deposit of the crop thereupon during reciprocation of the upper section; and
   structure carried by the roof thereabove for confining the crop on the roof during said reciprocation,
   said roof having an opening communicating with the body and a gate closing the opening during feeding of the crop onto the roof.

there being means for opening the gate from time-to-time to discharge the accumulated crop from the roof into the body.

2. In a continuous loading-stacking machine as claimed in claim 1, wherein said structure is collapsible for presenting an accumulating chamber that expands during the downstroke of the press and contracts during the upstroke thereof.

3. In a continuous loading-stacking machine as claimed in claim 2, wherein said structure includes a hood overlying the roof and collapsible sides between the hood and the roof, said hood having a connection with said lower section operable to hold the hood raised while said sides are collapsed and uncollapsed during reciprocation of said upper section.

4. In a continuous loading-stacking machine as claimed in claim 3, wherein said connection is at one end of said hood, there being a second connection between the roof and the hood at the opposite end of the latter for reciprocating said opposite end with the roof while said one end remains raised.

5. IN a continuous loading-stacking machine as claimed in claim 4, wherein said apparatus has a outlet adjacent said one end of the hood.

6. In a continuous loading-stacking machine as claimed in claim 5, wherein said hood overlies said roof for the full, normally fore-and-aft length of the body, said outlet being at the front of the body.

7. In a continuous loading-stacking machine as claimed in claim 6, wherein said opening is disposed at the rear of the roof for discharging the accumulated drop into the body at a point remote from said outlet.

8. In a continuous loading-stacking machine as claimed in claim 7, wherein said gate is provided with means for moving crop accumulating ahead of said opening rearwardly toward the latter as the gate is opened.

9. In a continuous loading-stacking machine as claimed in claim 1, wherein said apparatus has a crop outlet adjacent one end of the body and said opening is disposed adjacent the opposite end of the body for discharging accumulated crop into the body at a point remote from said outlet.

10. In a continuous loading-stacking machine as claimed in claim 9, wherein said structure extends the full end-to-end extent of said body.

11. In a continuous loading-stacking machine as claimed in claim 10, wherein said gate is provided with means for moving crop accumulating between said outlet and the opening toward the latter as the gate is opened.

12. In a continuous loading-stacking machine as claimed in claim 10, wherein said structure includes a hood having a connection with said lower section operable to hold the hood raised during reciprocation of the upper section, said structure further including collapsible sides interconnecting the hood and the roof for collapsing and uncollapsing during said reciprocation of the upper section to contract and expand an accumulating chamber defined by said hood, sides and roof.

13. In a continuous loading-stacking machine as claimed in claim 12, wherein said connection is adjacent said one end of the body, there being a second connection between the hood and the roof adjacent said opposite end of the body for canting the hood about the connection at said one end of the body during reciprocation of the upper section.

14. In a continuous loading-stacking machine as claimed in claim 13, wherein said connection between the hood and the lower section includes lost-motion means.

15. In a continuous loading-stacking machine as claimed in claim 1, wherein said structure includes a hood covering the body from end to end and adapted to lie against the roof when the upper section is raised.

16. In a continuous loading-stacking machine as claimed in claim 15, wherein said apparatus includes means for blowing the crop into the body, said roof and said hood having foraminuous escape means for the air associated with the crop entering the body.

17. In a continuous loading-stacking machine as claimed in claim 15, wherein said hood is provided with means for spacing the same from the roof vertically during lowering of the upper section yet maintaining the hood in position to prevent upward escape of crop fed onto the roof.

18. In a continuous loading-stacking machine as claimed in claim 17, wherein said hood is downwardly concave for guiding the crop fed between the hood and the roof downwardly onto the latter.

19. In a continuous loading-stacking machine as claimed in claim 17, wherein said hood is provided with collapsible sides between the same and said roof preventing lateral escape of the accumulating crop during reciprocation of the upper section.

20. In a continuous loading-stacking machine as claimed in claim 17, wherein said spacing and maintaining means includes a first connnection between the hood and the lower section at one end of the hood and a second connection between the hood and the roof at the opposite end of the hood for reciprocating said opposite end of the hood with the upper section while said one end of the hood remains stationary.

* * * * *